US006798378B1

(12) United States Patent
Walters

(10) Patent No.: US 6,798,378 B1
(45) Date of Patent: Sep. 28, 2004

(54) DEVICE AND METHOD FOR DISPLAYING TRACK CHARACTERISTICS

(75) Inventor: Thomas H. Walters, Gardner, KS (US)

(73) Assignee: Garmin Ltd. (KN)

( * ) Notice: Subject to any disclaimer, the term of this patent is extended or adjusted under 35 U.S.C. 154(b) by 0 days.

(21) Appl. No.: 10/302,386

(22) Filed: Nov. 22, 2002

(51) Int. Cl.$^7$ ............................................... H04B 7/185
(52) U.S. Cl. .................................. 342/357.06; 701/213
(58) Field of Search ....................... 342/357.01, 357.06, 342/357.08, 120, 419; 701/213, 214, 215

(56) References Cited

U.S. PATENT DOCUMENTS

| | | | |
|---|---|---|---|
| 5,210,540 A | * | 5/1993 | Masumoto ............. 342/357.11 |
| 5,820,080 A | * | 10/1998 | Eschenbach ................. 244/183 |
| 6,198,394 B1 | * | 3/2001 | Jacobsen et al. ......... 340/573.1 |
| 6,529,827 B1 | * | 3/2003 | Beason et al. ............... 701/213 |
| 6,542,121 B1 | * | 4/2003 | Beale et al. ................. 342/442 |
| 6,549,756 B1 | * | 4/2003 | Engstrom ................... 455/66.1 |
| 2001/0049470 A1 | * | 12/2001 | Mault et al. ................. 600/300 |
| 2002/0017989 A1 | * | 2/2002 | Forster et al. .............. 340/540 |
| 2003/0176798 A1 | * | 9/2003 | Simon ......................... 600/509 |
| 2003/0200026 A1 | * | 10/2003 | Pearson ....................... 701/301 |

FOREIGN PATENT DOCUMENTS

WO          WO 01/41879         *      6/2001

* cited by examiner

*Primary Examiner*—Dao Phan
(74) *Attorney, Agent, or Firm*—Devon A. Rolf

(57) ABSTRACT

A portable, handheld GPS unit (10) is operable to generate a track log corresponding a track traversed by a user and display a track display representative of the track traversed. The track display includes at least one track characteristic indicative of a feature sensed by at least one sensor (26) coupled with the GPS unit (10). The track characteristic of the track display varies in response to a change in the feature sensed by the sensor. For example, the track display may display a track of varying width, such that an increase in the track's width corresponds to an increase in the feature, and a decrease in the track's width corresponds to a decrease in the feature. Alternatively, the characteristic may be a track color change or a symbol indicating a predetermined amount change in the feature. The sensed feature may include altitude, distance, heart rate, temperature, light intensity, and oxygen content. In a first preferred embodiment, the sensor (26) is an altimeter (26) for determining an altitude of the GPS unit (10). In a second preferred embodiment, the sensor (126) is a sonar transducer (126) for determining a depth of a body of water. In a third preferred embodiment, the sensor (226) is a heart rate monitor (226)for determining a heart rate of the user. Additionally, the GPS unit (10) may be combined with a plurality of sensors (26, 126,226) for determining and displaying an indication of multiple features sensed by the sensors (26, 126,226).

32 Claims, 3 Drawing Sheets

DEVICE AND METHOD FOR DISPLAYING TRACK CHARACTERISTICS

BACKGROUND OF THE INVENTION

1. Field of the Invention

The present invention relates to a global positioning system ("GPS") unit operable to generate a track log of a track traversed by a user and to display a track display representative of the track. More particularly, the invention relates to a GPS unit operable to display a track display including at least one track characteristic indicative of a feature sensed by the GPS unit or one or more sensors coupled with the GPS unit.

2. Description of the Prior Art

The global positioning system ("GPS") is an electronic surveillance navigation system which permits users to determine their position with respect to the Earth. Global positioning may be determined with a handheld GPS receiver which detects and decodes signals from a number of satellites or biting the Earth. The signals from each of these satellites indicate the position of the satellite and the time at which the signals were sent. To decode the satellite signals, known as spread spectrum signals, and thereby calculate desired position and navigational data, a GPS receiver must first "find" or acquire the signals emitted from a minimum number of satellites. Once the receiver is "locked on" to the spread spectrum signals, the user's global position and other navigational data (e.g., velocity of movement) can be calculated.

In addition to determining the user's location information, many GPS units are operable to display the user's recent and present location as a track display. As the user traverses a track, the GPS unit generates a track log. The GPS unit then displays the track display, or electronic "breadcrumb" trail, representative of the track. One such GPS unit is sold by Garmin International, Inc., under the trade name e Trex Summit.

Prior art GPS units, however, are not operable to display a track display having characteristics indicative of a feature, such as elevation or altitude, water depth, or a heart rate of the user at a particular location, sensed by the GPS unit or additional sensors coupled with the GPS unit. Without illustrating additional information, the track display provides nothing more than an indication of where the user has traveled.

Accordingly, the need exists for an improved track display which displays additional information regarding features sensed by the sensor in relation to a location as determined by the GPS-based tracking or navigation device for the track traversed.

SUMMARY OF THE INVENTION

The present invention solves the above-described problems and improves upon the prior art of GPS units. In particular, the invention provides a GPS unit operable to display a track which illustrates not only the GPS unit's location, but also features such as altitude, water depth, heart rate of a user, or other characteristics, such as rate of ascent or descent, speed, acceleration, etc.

A first embodiment of the present invention includes a GPS unit coupled with an altimeter. The GPS unit calculates its current location and stores data representative of previous locations in a conventional manner. The altimeter determines an altitude or elevation of the GPS unit and sends a corresponding signal to the GPS unit. The GPS unit is operable to display a track display having characteristics that indicate a change in elevation as sensed by the altimeter. Specifically, if the altimeter senses that a track the user has traversed increases in altitude, the GPS unit displays a track display that visually indicates the increasing altitude. In one embodiment, this is done by displaying a track display of increasing width as the altitude increases. Conversely, if the track decreases in altitude, the track display decreases in width. Alternatively, the track display may include a symbol for a change in elevation. For example, for every 100 feet increase in elevation, the track display may display an up arrow, and for every 100 feet decrease in elevation, the track display may display a down arrow. Another alternative may use color to indicate the change in elevation. For example, an increase of 100 feet per a ten minute interval may be denoted by a red track display segment, and a decrease of 100 feet per a ten minute interval may be denoted by a green track display segment. If the user does not change elevation more or less than 100 feet per a ten minute interval, the track display segment may remain black.

A second embodiment of the present invention is a GPS unit coupled with a sonar transducer. The sonar transducer determines a depth of a body of water in a conventional manner and then sends a corresponding signal to the GPS unit. The GPS unit is operable to display a track display, including an indication of a change in depth, using any of the above track display characteristics. Similar to the change in elevation, the track display's width may increase as the depth increases and decrease as the depth decreases.

A third embodiment of the present invention is a GPS unit coupled with a heart rate monitor. A processor of the GPS unit may also include a computer program for calculating calorie expenditure based upon exertion. In the third embodiment, a track display may display a green track if the pulse rate is within a safe and acceptable range. Conversely, the track display may display a red track if the pulse rate is outside the safe and acceptable range. Alternatively, the track display may display a pulse rate value overlaid on the track's width, wherein the pulse rate varies with a rate of ascent or descent.

The GPS unit of the present invention may also be equipped to store in the GPS unit's memory a track traversed, map data corresponding to a track to be traversed, or routing algorithms based upon input starting and destination points operable to determine a particular track. Accordingly, when traversing the stored track (or track retrieved from the stored map or routing algorithm), a user of the GPS unit has an indication of an upcoming feature, depending on whether the sensor is an altimeter, sonar transducer, etc.

In addition to the above sensors of altimeter, sonar transducer, and heart rate monitor, the GPS unit of the present invention may also be coupled with other sensors or a combination of sensors for sensing other features. As with the above-described embodiments, the GPS unit is operable to display a track display with characteristics indicative of a change in the feature sensed by the sensor. For example, the GPS unit may be coupled with a thermometer for sensing a temperature of an environment in which the GPS unit is located. As the temperature increases, a corresponding portion of the track display may be colored red. Conversely, as the temperature decreases, the corresponding portion of the track display may be colored blue. Other sensors may include an oxygen content sensor and/or a light intensity sensor.

These and other important aspects of the present invention are described more fully in the detailed description below.

BRIEF DESCRIPTION OF THE DRAWING FIGURES

Preferred embodiments of the present invention are described in detail below with reference to the attached drawing figures, wherein.

DETAILED DESCRIPTION OF THE PREFERRED EMBODIMENTS

Figures 1, 2:
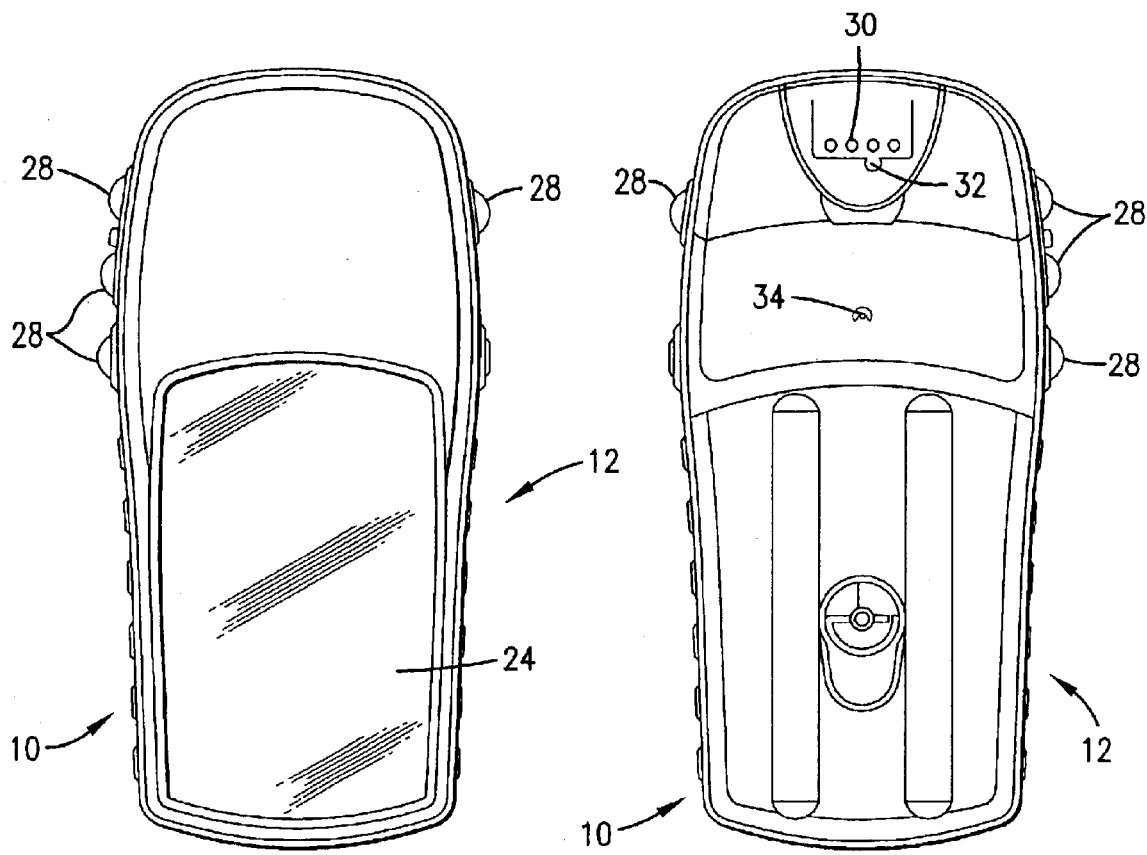
FIG. 1 is a front view of a GPS unit constructed in accordance with a preferred embodiment of the present invention.
FIG. 2 is a rear view of the GPS unit of the present invention.
Figure 3:
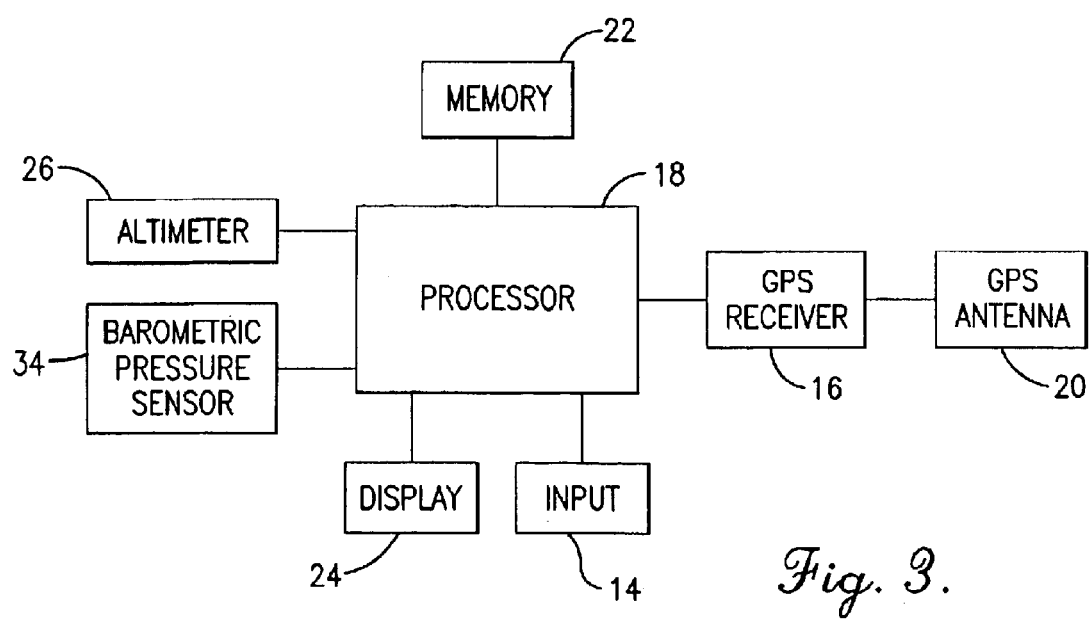
FIG. 3 is a block diagram of the components of a first preferred embodiment of the GPS unit of FIGS. 1 and 2.

Turning now to the drawing figures, and particularly FIGS. 1 and 2, a portable GPS unit 10 constructed in accordance with preferred embodiments of the invention is illustrated. As illustrated in FIGS. 1 and 3, the GPS unit 10 broadly comprises a portable, handheld housing 12 for housing or supporting components of the GPS unit 10; an input 14; a GPS receiver 16; a processor 18; a GPS antenna 20; a memory 22; a display 24; and an optional additional sensor(s) 26.

The housing 12 is preferably made of plastic or other similar material and is sized to be handheld, portable, and to substantially fit within a palm of a hand of a user or be worn by the user, such as in a hat or on an armband. Alternatively, the housing 12 is operable to be mounted to a dashboard of an automobile or to a boat, bicycle, or other mode of transportation.

The input 14 is positioned on an exterior of the housing 12. Preferably, the input 14 comprises a plurality of control buttons 28, as illustrated in FIGS. 1 and 2, which may be used to operate drop-down menus to select and input names or other identifiers. Alternatively, the input 14 may be an alphanumeric keypad (not shown), such as a telephone keypad, which may be used to type in names, identifiers, and text, or the input 14 may be a touch screen (not shown).

The GPS receiver 16 is positioned within the housing 12 and is operable to receive satellite signals from a plurality of satellites. The GPS receiver 16 is electronically coupled with the processor 18, and the processor 18 is operable to calculate a location of the GPS unit 10 as a function of the satellite signals. The GPS receiver 16 receives the satellite signals using the GPS antenna 20, such as a GPS patch antenna, which is electronically coupled with the GPS receiver 16 and positioned within the housing 12.

The memory 22 is electronically coupled with the processor 18 and is operable to store information, such as cartographic data (i.e. electronic maps). The cartographic data may be uploaded to the memory 22 from an external data source via a data connector 30 positioned on the exterior of the housing 12, as illustrated in FIG. 2.

As illustrated in FIGS. 1 and 2, the display 24 is also electronically coupled with the processor 18, is preferably a liquid crystal display ("LCD"), and is used to display location information and cartographic data representative of the current location of the GPS unit 10.

A power source, such as batteries or a battery pack (not shown), is used to supply power to the various electrical components. Alternatively, a power supply connection 32, as illustrated in FIG. 2, is positioned on the exterior of the housing 12 and is operable to be connected to an alternative power source for providing power to the GPS unit 10.

The processor 18 is also operable to generate a track log containing location information for a track the user has traversed. The display 24 then displays a track display representative of the track, as described in more detail below.

Figure 4:
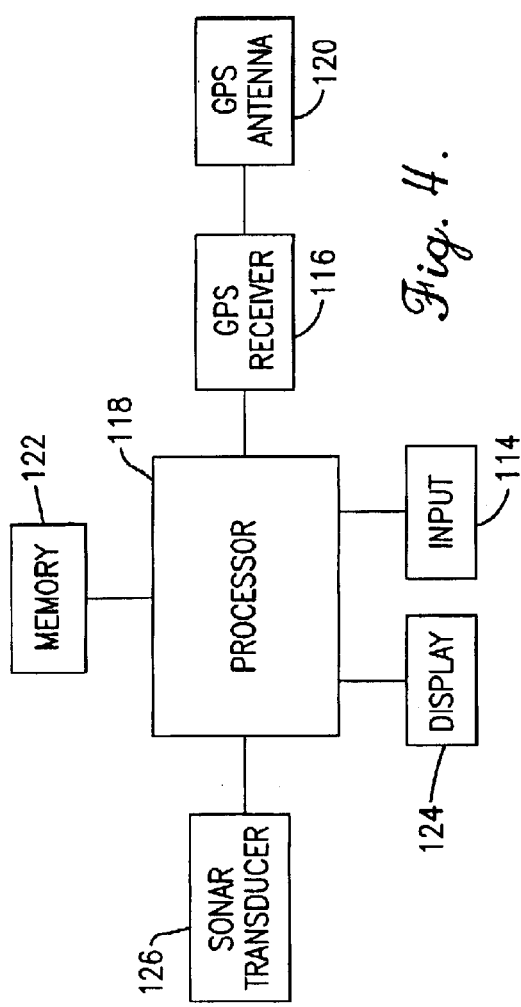
FIG. 4 is a block diagram of the components of a second preferred embodiment of the GPS unit of FIGS. 1 and 2.
Figure 8:
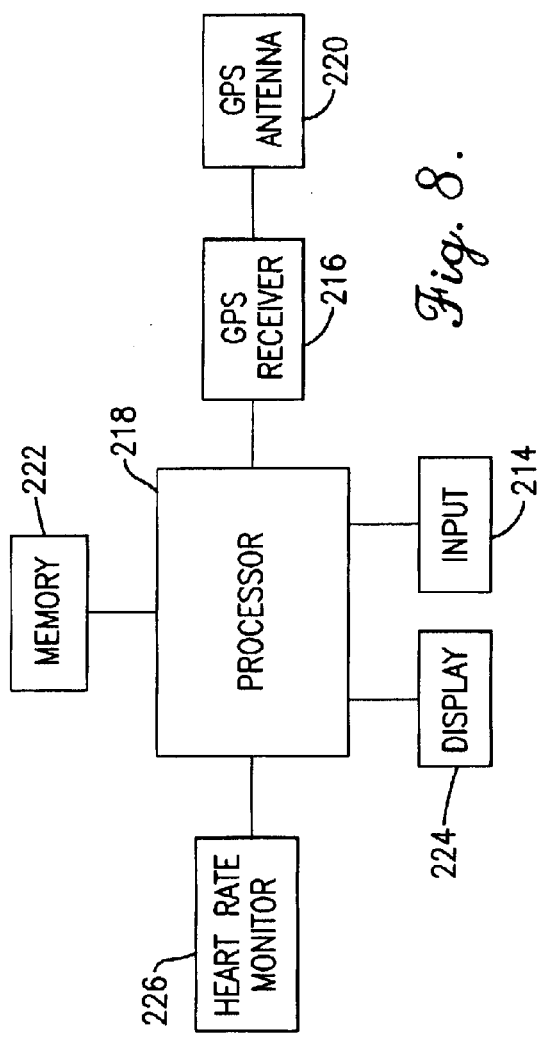
FIG. 8 is a block diagram of the components of a third preferred embodiment of the GPS unit of FIGS. 1 and 2.

The optional sensor 26 may be any device capable of sensing a feature in relation to a location of the GPS unit 10. For example, the sensor 26 may be an altimeter 26, as illustrated in FIG. 3, a sonar transducer 126, as illustrated in FIG. 4, a heart rate monitor, as illustrated in FIG. 8, a thermometer, a light intensity sensor, or an oxygen content sensor. The sensor 26 is preferably electronically coupled to the processor 18, such as by being positioned on or within the housing 12.

In accordance with a first preferred embodiment of the present invention, the sensor 26 is an altimeter 26 for sensing the altitude or elevation of the GPS unit 10 and for generating and sending to the GPS unit 10 a signal representative of the sensed altitude or elevation. Data indicative of the altitude is then transmitted to the display 24 by the processor 18, as described below.

Preferably, the GPS unit 10 of the first preferred embodiment also comprises a barometric pressure sensor 34 for calibrating altitude measurements obtained by the altimeter 26. The barometric pressure sensor 34 is preferably positioned on the exterior of the housing 12, as illustrated in FIG. 2. As is known in the art, in operation, minor atmospheric pressure changes may cause the displayed altitude to vary substantially from the actual altitude. The GPS unit 10 corrects for atmospheric pressure changes by determining the altitude of the GPS unit 10 using the barometric pressure sensor 34. A correction factor is determined using the altitude measurements obtained from the barometric pressure sensor 34 as compared to the altitude measurements obtained from the altimeter 26. A system and method for altitude calibration is described in U.S. Pat. No. 6,434,485 assigned to Garmin Corporation and hereby incorporated by reference.

Figure 5:
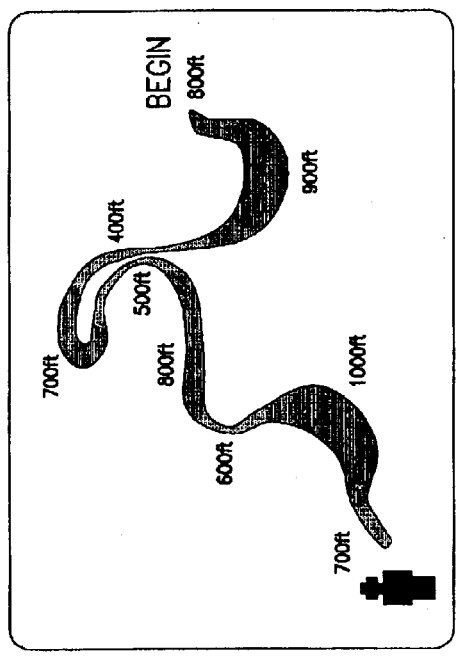
FIG. 5 is a schematic representation of a display of the GPS unit of FIG. 1 for the first preferred embodiment, wherein the track display's width varies in response to a change in elevation and the track display is shaded using a gray scale to indicate the change in elevation.
Figure 6:
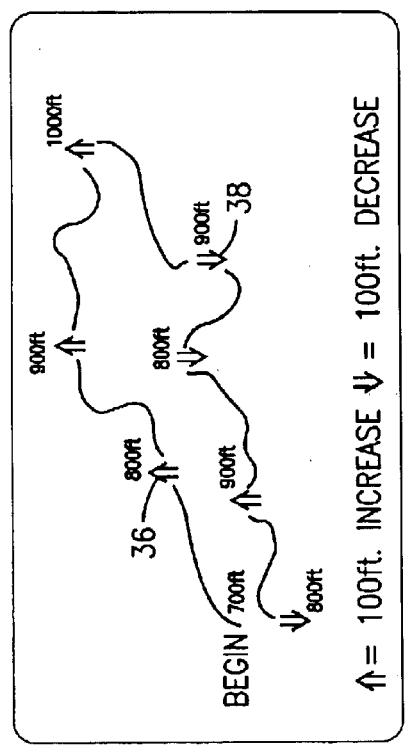
FIG. 6 is a schematic representation of the display of the GPS unit of FIG. 1 for the first preferred embodiment, wherein the track display displays symbols and numerical values to indicate the change in elevation.
Figure 9:
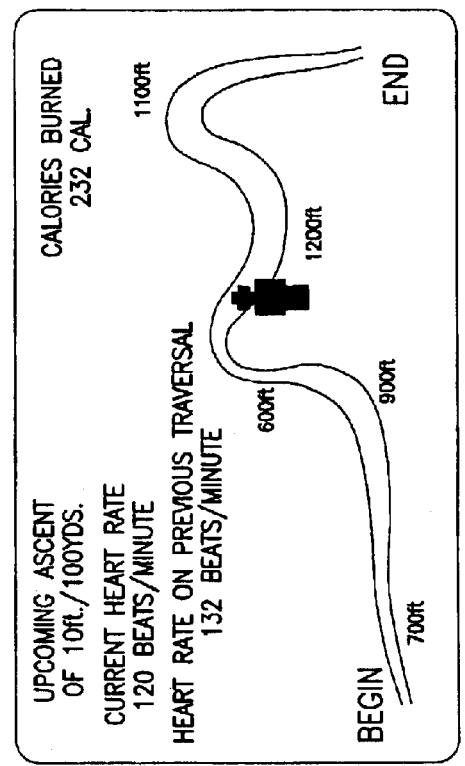
FIG. 9 is a schematic representation of a display of the GPS unit of FIG. 1 for the third preferred embodiment, wherein the display indicates information relating to ascent/descent, a heart rate of a user, and calories burned by the user, and the track display's width varies in response to the change in elevation.

As best illustrated in FIGS. 5 and 6, the GPS unit 10 of the present invention is operable to display the track display, wherein the track display includes characteristics indicative of the feature sensed by the sensor 26. In accordance with the first preferred embodiment, the track display illustrates a change in the altitude or elevation of the GPS unit 10. As illustrated in FIG. 5, the track display's width varies in response to the change in elevation, wherein an increase in the track display's width corresponds to an increase in elevation, and a decrease in the track display's width corresponds to a decrease in elevation. Also, as illustrated in FIG. 5, the track display may be shaded, such as a gray scale, to further indicate the change in elevation. Numerical representations may be overlaid on the track display or placed beside the track display to indicate elevation or any other sensed or calculated value. The track display may also indicate a rate of ascent or descent in relation to the GPS unit's location, as illustrated in FIG. 9.

Alternatively, and as illustrated in FIG. 6, the track display may include a plurality of symbols to represent the change in elevation. For example, an up arrow 36 may represent an increase in elevation of a set amount, such as 100 feet, and a down arrow 38 may represent a decrease in elevation of the same set amount. The track display may also include a numerical indication of the elevation, such as 800 feet, as illustrated in FIG. 6.

A second preferred embodiment of the present invention is substantially similar to the first preferred embodiment in that the GPS unit 10 of the second embodiment broadly comprises an input 114; a GPS receiver 116; a processor 118; a GPS antenna 120; a memory 122; a display 124; and a sensor 126, as illustrated in FIG. 4. In the second preferred embodiment, the sensor 126 is a sonar transducer 126. As is known in the art, the sonar transducer 126 is capable of determining a distance between the sonar transducer 126 and a solid surface, such as an ocean or lake floor. As is commonly used, the sonar transducer 126 measures a depth of a body of water by emitting sonar pulses. The sonar pulses are reflected as sonar echo signals. An intensity, a history time duration, and a depth spreading characteristic of the echo signals are indicative of the depth of the body of water. The GPS unit's processor 118 compares one or more of the intensity, the history time duration, and the depth spreading characteristics of the reflected signals and interprets the signals in relation to a corresponding set of parameters stored in the memory 122. The GPS unit 10 is operable to then display the interpretation of the signals on the display 124.

Figure 7:
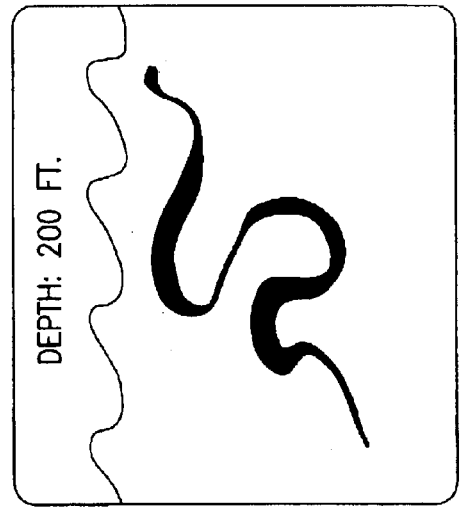
FIG. 7 is a schematic representation of the display of the GPS unit of FIG. 1 for the second preferred embodiment, wherein the track display's width varies in response toga change in a depth of a body of water.

As illustrated in FIG. 7, the GPS unit 10 is operable to display the interpretation of the echo signals on the track display in synchronization with a movement of the GPS unit 10. For example, as a boat equipped with the GPS unit 10 progresses along a track, the GPS unit 10 displays the track display on the display 124. The GPS unit 10, coupled with the sonar transducer 126, is also operable to display the change in depth of the water on the track display by varying the track display's width. The GPS unit 10 synchronizes the position of the GPS unit 10 with the corresponding water depth at that position, such that the user can determine the water's depth at any position on the track display. This is especially advantageous for fishing enthusiasts who wish to know water depth to determine if and what type of fish are located at any particular position.

As illustrated in FIG. 7, and similar to FIG. 5 and the track display illustrating the change in altitude, the track display for the change in the depth of the water is preferably a line, such that an increase in the line's width corresponds to an increase in depth, and a decrease in the line's width corresponds to a decrease in depth. The track display for depth may also be similar to FIG. 6 in that the track display may include symbols to represent a change in depth of a set amount. The track display may also be colored to indicate an increase/decrease in depth. An even further alternative track display may also include numerical indications of the depth of the water.

A third preferred embodiment of the present invention is substantially similar to the first and second preferred embodiments in that the GPS unit 10 of the third embodiment broadly comprises an input 214; a GPS receiver 216; a processor 218; a GPS antenna 220; a memory 222; a display 224; and a sensor 226, as illustrated in FIG. 8. In the third preferred embodiment, the sensor 226 is a heart rate monitor 226. The heart rate monitor 226 is operable to determine a heart rate of the user, and the processor 218 is operable to display the heart rate on the display 224. Preferably, a computer program is stored on the memory 222 for determining a safe and acceptable heart rate for the user, depending on the user's height, weight, age, etc. Additionally, the computer program preferably is capable of calculating calorie expenditure based on a grade of inclination/declination traversed and the user's speed, heart rate, etc.

The GPS unit 10 may also include a combination of sensors 226, such as an altimeter 26 and a heart rate monitor 226. A track display for the third preferred embodiment may then display such information as heart rate in relation to the particular grade of incline/decline. Additionally, the track display may include information relating to a length of incline/decline, as illustrated in FIG. 9. For example, for a given track, the track display may indicate an increase in elevation by a widening line, as described above. The track display may also indicate the user's heart rate by coloring the line (not shown), wherein a green line indicates a safe and acceptable heart rate and a red line indicates a heart rate outside the safe and acceptable range. This information would be especially beneficial to exercise or sporting enthusiasts who closely monitor their heart rate and physical exertion.

The GPS unit 10 is also operable to store in the memory 22,122,222 a track log for a track previously traversed, to retrieve map data for a planned track, or to store a planned track based on a routing algorithm where starting and destination points are inputted. For example, the GPS unit 10 may store locations points for the track the user is currently traversing. Upon subsequent traversal of the track by the user, the GPS unit 10 is operable to display upcoming characteristics of the track. The user then has information relating not only to location, but also to any feature previously sensed by the sensor 26,126,226 on the previous traversal of the track. For example, the track display may indicate, as with the third preferred embodiment, that an upcoming portion of the track has a rate of ascent of 10 feet per every 100 yards, and that on the previous traversal, the user's heart rate was 132 beats per minute, as illustrated in FIG. 9. The user may then compare their present heart rate to the previous heart rate for that portion of the track to gauge an increase or decrease in the user's fitness level.

Alternatively, the user may retrieve a track stored as map data on the memory 222 and display the track so as to be informed of upcoming inclines/declines. If a sonar transducer 126 is being used, water depth information would be beneficial to inform the user on where a certain type of fish may be located.

Figure 10:
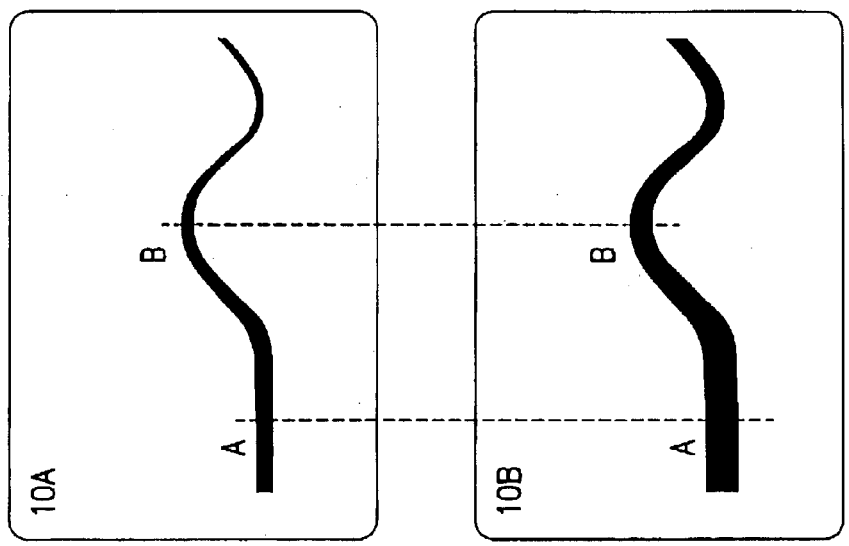
FIG. 10A is a schematic representation of a display at an original time, wherein the track display's width varies in response to a change in a feature sensed.
FIG. 10B is a schematic representation of a display at a time subsequent to the original time, wherein the track display's width has dynamically changed to compensate for the change in the feature sensed.

The track display of the GPS unit 10 of the present invention may also be dynamic in that the representation of the track traversed (or about to be traversed) may vary as the activity being monitored varies, as illustrated in FIG. 10. For example, if the user is proceeding on flat ground, with no incline or decline, a thin line maybe used to represent the track traversed. As indicated in the first preferred embodiment, as the elevation of the GPS unit 10 and the user increases, the line's width increases. If the line begins as relatively thin, as noted at point A of FIG. 10A, since the user is traversing flat ground, then if the user subsequently begins to decline at a particular rate, the line's width may be insufficient to allow for lessening width to indicate the decreasing elevation, as noted at point B of FIG. 10A. Accordingly, at that point at which the descent begins to occur, as noted at point B of FIG. 10B, or at a subsequent point corresponding to a determined need to adjust the line's width, that portion of the track displayed behind the user may dynamically widen to indicate flat traversal, as noted at point A of FIG. 10B, thereby permitting space for thinning of the line to indicate the descent. Depending on a sensitivity of the sensors 26,126,226, thresholds may be established to prevent adjustments to the graphical representation for slight variations in a sensed value.

From the preceding description, it can be seen that the GPS unit 10 of the present invention allows for a concise and more easily readable and comprehendible illustration of the change in elevation and/or depth. Although the invention has been described with reference to the preferred embodiments illustrated in the attached drawings, equivalents may be employed and substitutions made herein without departing from the scope of the invention recited in the claims. For example, although the sensors 26,126 of the first and second embodiments of the invention have been described using the altimeter 26 and the sonar transducer 126, respectively, to sense the feature, other sensors may also be used, such as a light intensity sensor, a thermometer, or an oxygen content sensor.

The light intensity sensor is helpful in spelunking to determine a distance from a cave's opening. As described above, the GPS unit 10 displays the track display indicative of the track the user has traversed through the cave. The track display may also include a track characteristic indicative of the intensity of light sensed by the light intensity sensor. For example, the track display may change color as the light intensity changes. The light intensity sensor may also be helpful in research, such as determining an optimal light intensity for growth of a plant in a particular location.

The thermometer coupled with the GPS unit 10 may be used to track changes in temperature with respect to changes in elevation. The track display may display a symbol for every two degree change in temperature. This could be especially informative to a hiker, since a change in temperature often forecasts a change in weather patterns at high elevations.

The oxygen content sensor may be used in high-altitude hiking to determine a safe oxygen content level so that a hiker does not become ill due to altitude sickness. If the hiker knows that he or she requires a minimum oxygen level in order to not become ill, then the track display that displays not only the path the hiker is traveling, but also the oxygen content and changes in the oxygen level, is especially beneficial.

For all of the above examples, the track display of the present invention simplifies use and affords quick comprehension for the user. The track display also informs the user of his or her location and of possible hazardous environmental features.

The GPS unit 10 of the present invention may also employ track displays that use other characteristics, such as various line types, to represent the change in the feature. For example, the track display may use a dotted line to represent the increase in the feature and a dashed or hatched line to represent the decrease in the feature. Alternatively, the track display may display a plurality of a varying-sized shape to represent the change in the feature. For example, increasingly larger box shapes may be used to represent the increase in the feature, and decreasingly smaller box shapes may be used to represent the decrease in the feature. The track display may also display dots, arrows, dashes, or hatched lines to represent a change in the feature sensed by the sensor.

The GPS unit 10 of the present invention may also be coupled with more than one sensor 26,126,226, thus allowing it to display multiple environmental features, as discussed above. Each feature could then be designated by a different characteristic.

Having thus described the preferred embodiment of the invention, what is claimed as new and desired to be protected by letters patent includes the following:

1. A portable GPS unit comprising:
   a GPS receiver for receiving satellite signals from a plurality of satellites;
   a processor coupled with the GPS receiver for calculating a location of the GPS unit as a function of the satellite signals; and
   a display, coupled with the processor, for displaying a single track display which itself indicates both a user's recent and present location and a track characteristic representing at least one feature sensed by at least one sensor, wherein the track characteristic of the track display varies in response to a change in the feature as sensed by the sensor.

2. The portable GPS unit as set forth in claim 1, further comprising memory that stores cartographic data.

3. The portable GPS unit as set forth in claim 1, wherein the sensor is an altimeter adapted to sense an altitude of the GPS unit.

4. The portable GPS unit as set forth in claim 3, further comprising a barometric pressure sensor for sensing atmospheric information from which the processor calibrates altitude information obtained from the altimeter.

5. The portable GPS unit as set forth in claim 1, wherein the sensor is selected from the group consisting of: a heart rate monitor, a sonar transducer, a thermometer, a light intensity sensor, and an oxygen content sensor.

6. The portable GPS unit as set forth in claim 1, wherein the track characteristic is a line of varying width.

7. The portable GPS unit as set forth in claim 6, wherein an increase in line width corresponds to an increase in the feature sensed by the sensor, and a decrease in line width corresponds to a decrease in the feature sensed by the sensor.

8. The portable GPS unit as set forth in claim 1, wherein the track characteristic is a symbol representing a change in the feature sensed by the sensor.

9. The portable GPS unit as set forth in claim 1, wherein the track characteristic is a plurality of varying-sized symbol, and an increase in the symbol's size corresponds to an increase in the feature sensed by the sensor, and a decrease in the symbol's size corresponds to a decrease in the feature sensed by the sensor.

10. The portable GPS unit as set forth in claim 1, wherein the track display changes color in response to the change in the feature sensed by the sensor.

11. The portable GPS Unit as set forth in claim 1, wherein the track characteristic is a line style representing a change in the feature sensed by the sensor, and the line style is selected from the group consisting of: dashes, dots, arrows, hatched liens, and symbols.

12. The portable GPS unit as set forth in claim 1, wherein the track display dynamically changes to compensate for variations in the feature sensed.

13. A portable GPS unit comprising:
   a GPS receiver for receiving satellite signals from a plurality of satellites;
   a processor coupled with the GPS receiver for calculating a location of the GPS unit as a function of the satellite signals;
   an altimeter for determining an altitude of the GPS unit; and
   a display, coupled with the processor, for displaying a single track display which itself indicates both a user's recent and present location and a track characteristic representing a change in the altitude of the GPS unit, wherein the change in the altitude of the GPS unit is represented by a line of varying width.

14. The portable GPS unit as set forth in claim 13, further comprising a barometric pressure sensor for sensing atmospheric information from which the processor calibrates the altitude obtained from the altimeter.

15. The portable GPS unit as set forth in claim 13, wherein an increase in line width corresponds to an increase in the altitude of the GPS unit, and a decrease in line width corresponds to a decrease in the altitude of the GPS unit.

16. A portable GPS unit comprising:
   a GPS receiver for receiving satellite signals from a plurality of satellites;
   a processor coupled with the GPS receiver for calculating a location of the GPS unit as a function of the satellite signals;
   an altimeter for determining an altitude of the GPS unit;
   a barometric pressure sensor for sensing atmospheric information from which the processor calibrates the altitude obtained from the altimeter; and
   a display coupled with the processor and operable for displaying a single track display which itself indicates both a user's recent and present location and a track characteristic representing an indication of changes in the altitude of the GPS unit.

17. The portable GPS unit as set forth in claim 16, wherein the indication of changes in the altitude is selected from the group consisting of: a line of varying width, symbols, and a line of varying color.

18. A portable GPS unit comprising:
   a GPS receiver for receiving satellite signals from a plurality of satellites;
   a processor coupled with the GPS receiver for calculating a location of the GPS unit as a function of the satellite signals;
   a sonar transducer for determining a distance between the sonar transducer and a solid surface; and
   a display coupled with the processor and operable for displaying a single track display which itself indicates both a user's recent and present location and a track characteristic representing the distance determined by the sonar transducer, wherein the track characteristic varies in response to a change in the distance determined by the sonar transducer.

19. The portable GPS unit as set forth in claim 18, wherein the characteristic of the track display is a line of varying width.

20. The portable GPS unit as set forth in claim 19, wherein an increase in the line's width corresponds to an increase in depth as determined by the sonar transducer, and a decrease in the line's width corresponds to a decrease in depth as determined by the sonar transducer.

21. A portable GPS unit comprising:
   a GPS receiver for receiving satellite signals from a plurality of satellites;
   a processor coupled with the GPS receiver for calculating a location of the GPS unit as a function of the satellite signals;

a heart rate monitor for determining a heart rate of a user of the GPS unit; and a display coupled with the processor and operable for displaying a single track display which itself indicates both a user's recent and present location and a track characteristic representing the heart rate of the user as determined by the heart rate monitor at a particular location as determined by the GPS unit.

22. The GPS unit as set forth in claim 21, wherein the track characteristic is a line, and the line changes color in response to a change in the heart rate of the user.

23. A method for displaying on a GPS unit display a track display having at least one track characteristic indicative of at least one feature sensed by a sensor, the method comprising the steps of:

receiving satellite signals from a plurality of satellites;

calculating a location of the GPS unit as a function of the satellite signals;

sensing at least one feature using at least one sensor;

displaying on the display a single track display which itself indicates both a user's recent and present location and a track characteristic representing at least one feature sensed by at least one sensor, wherein the track characteristic varies in response to a change in the feature as sensed by the sensor.

24. The method as set forth in claim 23, further comprising the step of storing cartographic data in a memory.

25. The method as set forth in claim 24, wherein the sensor is selected from the group consisting of: an altimeter, a barometric pressure sensor, a sonar transducer, a heart rate monitor, a thermometer, a light intensity sensor, and an oxygen content sensor.

26. The method as set forth in claim 25, further comprising the steps of sensing atmospheric pressure using the barometric pressure sensor and then calibrating an altitude sensed by the altimeter using the atmospheric pressure information.

27. The method as set forth in claim 25, wherein the track characteristic is a line of varying width.

28. The method as set forth in claim 27, wherein an increase in line width corresponds to an increase in the feature sensed by the sensor, and a decrease in line width corresponds to a decrease in the feature sensed by the sensor.

29. The method as set forth in claim 25, wherein the track characteristic is a symbol representing the change in sensed feature.

30. The method as set forth in claim 25, wherein the track characteristic is a plurality of varying-sized symbol.

31. The method as set forth in claim 30, wherein an increase in the symbol's size corresponds to an increase in the feature sensed by the sensor, and a decrease in the symbol's size corresponds to a decrease in the feature sensed by the sensor.

32. The method as set forth in claim 25, wherein the track display changes color in response to the change in the feature sensed by the sensor.

* * * * *